(12) United States Patent
Basch et al.

(10) Patent No.: US 7,002,514 B2
(45) Date of Patent: Feb. 21, 2006

(54) USING MULTIPLE DETECTION ALGORITHMS IN POSITIONING SIGNAL PROCESSING

(75) Inventors: Julien Basch, South San Francisco, CA (US); Andrew Chou, South San Francisco, CA (US); Robert Lorenz, Menlo Park, CA (US); Jesse Stone, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 53 days.

(21) Appl. No.: 10/759,921

(22) Filed: Jan. 15, 2004

(65) Prior Publication Data

US 2004/0167713 A1 Aug. 26, 2004

Related U.S. Application Data

(60) Provisional application No. 60/440,974, filed on Jan. 17, 2003.

(51) Int. Cl.
*H04B 7/185* (2006.01)

(52) U.S. Cl. .............................. 342/357.15; 342/357.01

(58) Field of Classification Search ........... 342/357.01, 342/357.02, 357.06, 357.15; 701/207, 213, 701/214
See application file for complete search history.

(56) References Cited

U.S. PATENT DOCUMENTS

| | | | |
|---|---|---|---|
| 6,028,883 A * | 2/2000 | Tiemann et al. ............ 375/150 |
| 6,075,987 A | 6/2000 | Camp, Jr. et al. | |
| 6,295,024 B1 | 9/2001 | King et al. | |
| 6,301,545 B1 | 10/2001 | Brodie | |
| 6,324,227 B1 * | 11/2001 | Kang et al. ................. 375/343 |
| 6,873,910 B1 * | 3/2005 | Rowitch et al. ............ 701/213 |
| 2002/0064210 A1 | 5/2002 | Sullivan | |
| 2003/0112856 A1 * | 6/2003 | Challa et al. ................ 375/148 |
| 2004/0041729 A1 * | 3/2004 | Rowitch ................ 342/357.15 |

* cited by examiner

*Primary Examiner*—Dao Phan
(74) *Attorney, Agent, or Firm*—Edward C. Kwok; MacPherson Kwok Chen & Heid LLP

(57) ABSTRACT

A systematic method for acquiring positioning signals, such as global positioning system (GPS) signals, uses different signal detection algorithms at different stages of signal detection. For example, a method for detecting multiple positioning signals may include first detecting a first positioning signal using a robust but less sensitive signal detection method, such as non-coherent integration. Based on the signal parameter values that allow detection of the first positional signal, detecting a second positioning signal using a more sensitive method, such as coherent integration. In this manner, by capturing the strongest signal first using a robust method, signal detection parameter values common to positioning signals can be narrowed to allow subsequent signal acquisitions using a more sensitive—but computationally more intensive—method.

10 Claims, 2 Drawing Sheets

USING MULTIPLE DETECTION ALGORITHMS IN POSITIONING SIGNAL PROCESSING

This application claims the benefit of U.S. Provisional application No. 60/440,974 filed Jan. 1, 2003.

BACKGROUND OF THE INVENTION

1. Field of the Invention

The present invention relates to the processing of positioning signals, such as signals received from the NAVSTAR Global Positioning System (GPS). In particular, the present invention relates to detecting positioning signals, by first using a less sensitive, more robust technique, followed with further processing using a more sensitive technique.

2. Discussion of the Related Art

Algorithms for the detecting positioning signals, such as GPS signals, differ in their sensitivity, robustness, ease of implementation, and computational resources requirements. Often, sensitive algorithms are computationally more demanding and less robust than less sensitive algorithms.

Two well-known algorithms for signal detection are coherent integration and non-coherent integration. In coherent integration, the received positioning signal is multiplied variously with locally generated replicas of the expected satellite signal of different code phases and carrier frequencies, and each product is integrated for a time period equal to the signal capture time. Following this integration step, the magnitude of each integrated product is computed and, after further processing that may include interpolation, the magnitudes are each compared to a threshold to ascertain whether the positioning signal to be detected is present. Non-coherent integration is similar to coherent integration, except that the magnitudes or square magnitudes are computed at regular subintervals of the signal capture and the results are then summed, processed, and finally compared to a threshold value.

In both the coherent and the non-coherent integration algorithms, multiple trial code phases and frequencies are tested. In coherent integration, the trial frequencies (the "frequency bins") are spaced by $$\frac{1}{T},$$

where T is the interval of coherent integration. Compared to non-coherent integration, coherent integration has a higher sensitivity, at the expense of a lesser robustness and a higher computational requirement. Coherent integration methods have been developed that trade robustness for less computational complexity. Coherent integration may also search over additional parameters such as oscillator phase acceleration.

In certain environments, such as in urban locations, the positioning signals may be attenuated because of propagation through walls, reflections off of buildings and other signal distortions. Typically, because of the spatial distribution of the positioning signal sources, the positioning signals from each of the sources will be subject to different amounts of attenuation and reflection. As a result, it is rare that two positioning signals are attenuated by the same amount. Indeed, the signal powers of the received sources typically have a distribution in which there is considerable difference between the strongest positioning signal and the other signals.

Numerous techniques for GPS signal detection are disclosed in the following U.S. patent applications:

1. Signal Acquisition using Data Bit Information (Ser. No. 09/888,228 filed Jun. 22, 2001, hereinafter referred to as "Application 228"),
2. Synthesizing Coherent Correlation Sums at One or Multiple Carrier Frequencies Using Correlation Sums Calculated at a Coarse Set of Frequencies (Ser. No. 09/888,227 filed Jun. 22, 2001, hereafter referred to as "Application 227"),
3. Extracting Fine-Tuned Estimates from Correlation Functions Evaluated at Limited Number of Values (Ser. No. 09/888,338 filed Jun. 22, 2001, hereafter referred to as "Application 338"),
4. Determining the Spatio-Temporal and Kinematic Parameters of a Signal Receiver and its Clock by Information Fusion (Ser. No. 09/888,229 filed Jun. 22, 2001, hereafter referred to as "Application 229"),
5. Determining Location Information Using Sampled Data Containing LocationDetermining Signals And Noise (Ser. No. 09/888,337 filed Jun. 22, 2001, hereafter referred to as "Application 337"),
6. Method for optimal search scheduling in satellite acquisition (Ser. No. 10/126,853, filed on Apr. 19, 2002, hereafter referred to as "Application 853"),
7. System and method to estimate the location of a receiver in a multi path environment (Ser. No. 10/237,556, filed on Sep. 6, 2002, hereafter referred to as "Application 556"),
8. System and method to estimate the location of a receiver (Ser. No. 10/237,557 filed on Sep. 6, 2002, hereafter referred to as "Application 557"), and
9. Multifunction device with positioning system and shared processor (Ser. No. 10/286,360 filed on Nov. 1, 2002, hereafter referred to as "Application 360").

The above patent applications are incorporated by reference herein in their entireties.

SUMMARY OF THE INVENTION

The present invention provides a systematic method for acquiring positioning signals, such as global positioning system (GPS) signals, using different signal detection algorithms at different stages of signal detection. According to one embodiment of the present invention, a method for detecting multiple positioning signals includes first detecting a first positioning signal using a robust but less sensitive signal detection method, such as non-coherent integration. Based on the signal parameter values that allow detection of the first positional signal, detecting a second positioning signal using a more sensitive method, such as coherent integration. In this manner, by capturing the strongest signal first using a robust method, signal detection parameter values can be narrowed to allow a subsequent signal acquisition using a more sensitive, albeit more computationally intensive, method.

In one embodiment, the values of one or more signal detection parameters can be determined upon acquisition of the first signal. Such signal detection parameter determination includes aligning the first positioning signal relative to a navigation message embedded in the first positioning signal, determining an oscillator frequency, and determining an oscillator phase acceleration.

Non-coherent integration for capturing the initial positioning signal can be achieved using correlation values computed based on predetermined-size blocks of a received signal, such as 4 millisecond blocks. A search for oscillator frequency or oscillator phase acceleration can be performed in the frequency domain. Prior to signal detection using a more sensitive method (e.g., coherent integration), the effects of any navigation message in the positioning signal can be removed. In one embodiment, the effects of a navigation message is removed using a method involving doubling an estimated phase angle.

Unlike methods and systems for processing positioning signals which utilize a single detection algorithm and which yields a particular sensitivity and robustness for a given computational cost, the methods of the present invention allows combining multiple detection algorithms to exploit the variation in the signal powers of the received positioning signals that commonly exist in the urban environment. By searching initially using a less sensitive and more robust algorithm, and upon the detection of the first positioning signal, computing additional information that is common to all the received positioning signals using the first detection, the search for the remaining positioning signals can use a more sensitive algorithm with greatly reduced computational requirements. For a mobile GPS device, the savings in computation intensity can often be large enough to capture positioning signals in an environment that makes such capture unattainable for the capabilities of such a device.

When the received signal powers have a sufficiently wide distribution, the present invention combines the best attributes of the various detection algorithms; namely, it enjoys almost the same sensitivity of the most sensitive algorithms and the robustness and computational efficiency of the less sensitive algorithms. In urban environments, signal powers exhibit a sufficiently wide distribution to make this invention highly desirable.

The present invention is better understood upon consideration of the detailed description below and the accompanying drawings.

DETAILED DESCRIPTION OF THE PREFERRED EMBODIMENTS

Figure 1:
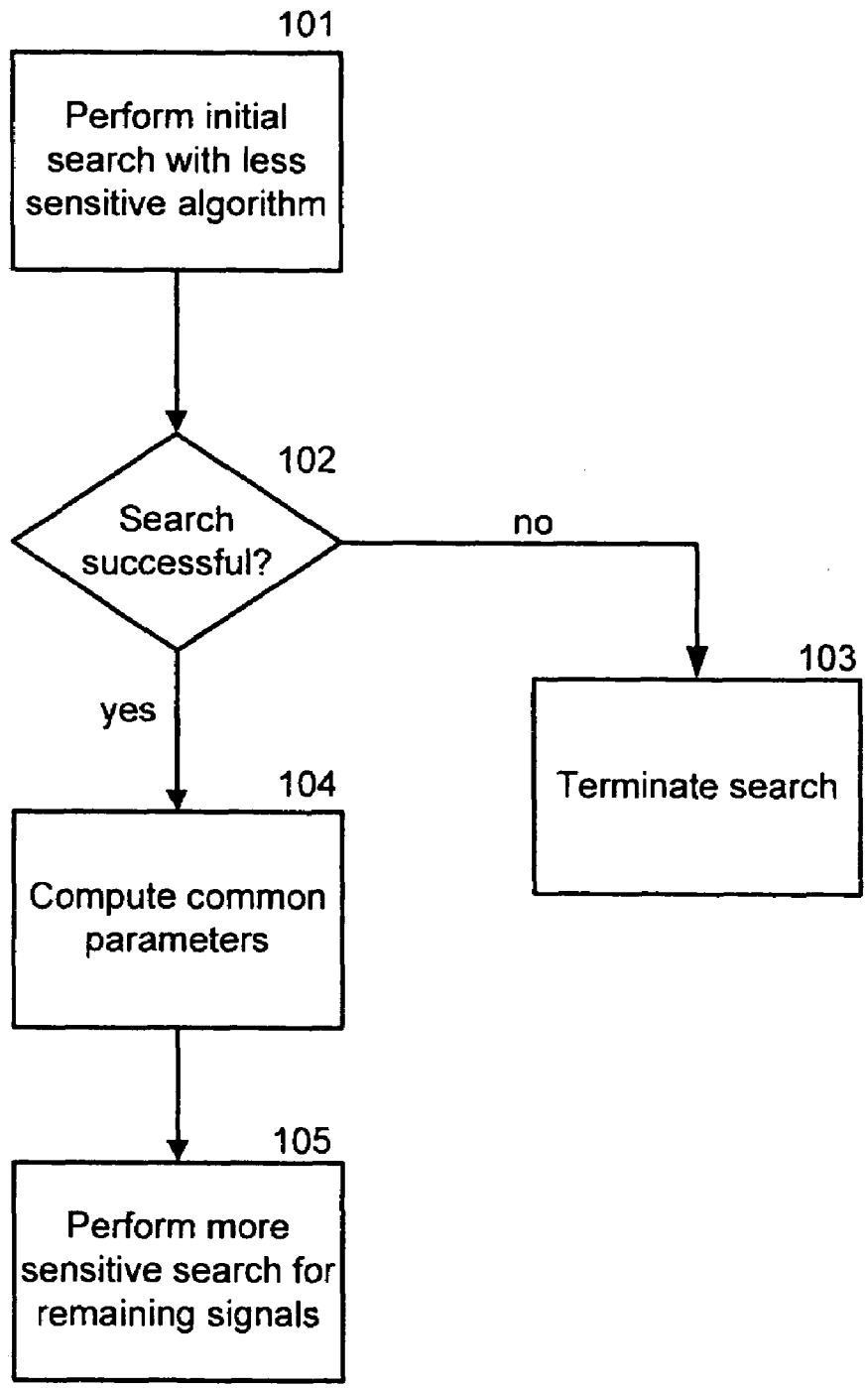
FIG. 1 illustrates, generally, a method according to one embodiment of the present invention.

FIG. 1 illustrates, generally, a method in accordance with one embodiment of the present invention. As shown in FIG. 1, an initial search at step 101 uses a relatively less sensitive algorithm to find the strongest positioning signal. At step 102, the initial search is checked to determine whether or not signal detection is successful. If signal detection is not successful, signal detection terminates at step 103. If signal detection is successful, at step 104, the strongest signal thus detected is used to compute one or more parameters common to all positioning signals (e.g., the oscillator frequency offset and phase acceleration[1]). At step 105, the computed values of the common parameters are used in the search for the remaining signals using a more sensitive algorithm.

Figure 2:
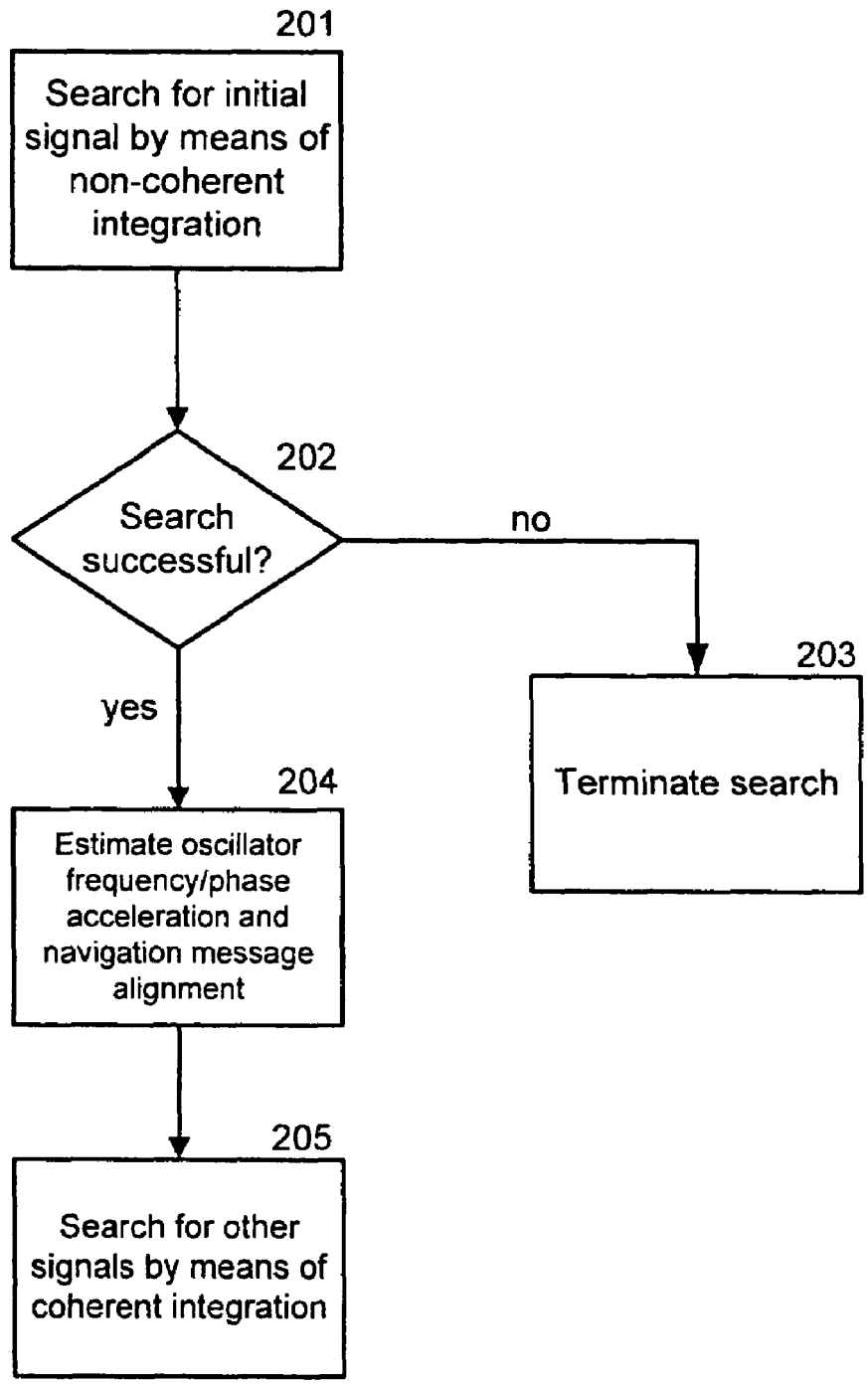
FIG. 2 illustrates in further detail a method in according to one embodiment of the present invention.

FIG. 2 illustrates in further detail a method according to one embodiment of the present invention. As shown in FIG. 2, at step 201, an initial search for a positioning signal is performed using non-coherent integration. In this embodiment, a received GPS positioning signal is divided into 4 milliseconds (ms) blocks. In general, block sizes between 1 ms and 14 ms may be chosen; choosing a shorter block allows a less fine frequency search, while choosing a longer block yields better sensitivity. Such non-coherent integration does not require a precise navigation message alignment, and is robust to oscillator phase accelerations, and requires a spacing between trial frequencies in the order of 125 Hz. Typically, a non-coherent integration over one second of a GPS signal is about 6 dB less sensitive than a coherent integration over the same one second of the GPS signal. As the number of trial frequencies to search is proportional to the reciprocal of the integration period times the uncertainty in the code phase, if one uses 8 ms blocks for non-coherent processing, an improved sensitivity can be achieved, but such non-coherent processing would require either a better frequency estimate or testing additional trial frequencies.

[1] Phase acceleration is the rate of change of oscillator frequency

At step 202, the initial search is checked to determine if a positioning signal is detected. If a positioning signal is not detected, the search terminates at step 203. Alternatively, at step 204, upon successfully detecting an initial positioning signal, the detected positioning signal is used to estimate one or more signal parameters such as oscillator frequency, oscillator phase acceleration, and the navigation message alignment. If an approximate location of the receiver is known, an absolute time stamp can be calculated which can then be used to reduce the code phase uncertainties of the other positioning signals to be detected.

According to one embodiment, at step 204, complex 1-ms segments of the detected signal are correlated with a reference signal of various trial carrier frequencies and code phases, as described in the copending patent applications incorporated by reference above. The 1-ms correlation length is selected as a convenient length for aligning the navigation message. Navigation message alignment can be estimated using, for example, the technique disclosed in U.S. Pat. No. 6,295,023, entitled, "Methods, mobile stations and systems for acquiring global positioning system timing information" by Scott Bloebaum, which is hereby incorporated by reference in its entirety. To align the navigation message, a first step determines a 20-ms navigation bit boundary. The navigation bit boundary positions can be determined using non-coherent integration using coherent blocks of 20 ms, and choosing the boundary position that maximizes the integration. Individual navigation bit positions can then be determined by testing different alignments of the navigation message, using coherent or non-coherent integration (with block sizes greater than 20 ms), and choosing the alignment that yields the highest integration value.

In the presence of oscillator phase acceleration, a long coherent integration is difficult. Instead, for navigation message alignment, non-coherent integration using block sizes between 20–100 ms can be used or, alternatively, a coherent integration that also searches for phase acceleration can be used for navigation message alignment. If non-coherent integration is used, a block length which is a multiple of 20 ms is preferably not used so as to avoid ambiguities.

If navigation message alignment is not required or if a small sensitivity loss is acceptable, correlation lengths greater than 1 ms may be used to reduce memory requirements. The resulting complex correlations can then be used to refine the estimate of oscillator frequency, oscillator phase acceleration, the navigation message alignment and, if an approximate location of the receiver is known, an approximate time-stamp.

After alignment of the navigation message, oscillator phase acceleration can be estimated and estimates of oscillator frequency can be improved, using various trial oscillator phase accelerations and oscillator frequencies, and finding the values that provide the best coherent integration over the 1-ms correlations. In other words, if $s_k$ denotes the 1-ms complex correlations for k=1, 2,3, . . . N, then the oscillator frequency $f$ and phase acceleration $\alpha$ are given by the trial frequency and the trial phase acceleration that maximize the following expression:

$$\max_{f,\alpha} \sum_{k=1}^{N} s_k e^{2\pi j(f_k + 0.5\alpha k^2)}$$

Note that this search for $f$ and $\alpha$ operates on the 1-ms correlation values, and hence, for one second of GPS signal, each coherent integration involves 1000 correlation values. Thus, even simple brute force methods are not computationally onerous. Even then, after aligning the navigation message, the 1-ms complex correlations can be combined to further reduce the number of values for integration. One such combination combines M 1-ms correlations into a single value $t_k$ using:

$$t_k = \sum_{i=1}^{M} s_{((k-1)M+i)} e^{2\pi j\left(((k-1)M+i)f' + 0.5\alpha'((k-1)M+i)^2\right)}$$

where $f$ and $\alpha$ are the current estimates of oscillator frequency and phase acceleration, respectively.

Alternatively, instead of using a time domain method, the search for oscillator frequency and phase acceleration at step 204 may be carried out in the frequency domain. A Fast Fourier Transform (FFT) may be used to test many trial frequencies simultaneously. Trial phase acceleration can be tested in either the time domain by first multiplying each correlation by its phase acceleration or in the frequency domain by convolving the FFT of each correlation by the transform of the trial phase acceleration value.

Navigation message alignment can also be performed after oscillator frequency and phase acceleration estimates. To estimate oscillator frequency and phase acceleration before aligning the navigation message, the effects of the navigation message is first removed. It is tempting to remove such effects by taking the magnitude of the received signal. However, since taking magnitude of a signal destroys phase information, taking magnitude of a signal is therefore unsuitable for estimating phase acceleration. Since the correlation values are complex, an alternative method to eliminate the effects of the navigation message is to double the phase angle. For a given phase angle, doubling the phase angle is equivalent to first adding 180 degrees to the phase angle and then doubling the sum. Since adding 180 degree is equivalent to reverse the sign of a complex number, doubling the phase angle removes the navigation message, without removing the phase angle information. Such a method can thus be used to estimate phase acceleration.

At step 205, coherent integration can be used to search for additional and weaker positioning signals using, for example, methods disclosed in Applications 557 and 227 and a longer coherent integration. The estimates of parameter values computed in step 204 are essential for the robustness and low computational cost of step 205. If an accurate timestamp is obtained at step 204, search for additional positioning signals can be carried out user a finer estimate of code phases. In one embodiment, coherent integrations of 2–10 ms (the integration interval can be determined based on the residual frequency uncertainty) are stored in a two-dimensional memory array in which the rows correspond code phases and the columns correspond to time samples. After correcting for the navigation message, a FFT of the data of each row allows the search to be carried out in the frequency domain. Further, refinements of code phase and frequency can also be performed using interpolation, as described in Application 338.

By using non-coherent integration to detect the positional signal of the strongest satellite, the above algorithm has greatly reduced computational cost. From this strongest satellite, estimates for absolute time, oscillator frequency, and oscillator phase acceleration can be obtained. The time and oscillator frequency allows the search spaces of carrier frequency and code phases to be narrowed substantially. The estimates of the frequency and code phases thus obtained allow long coherent integration to facilitate searching positional signals from additional satellites.

The above detailed description is provided to illustrate the specific embodiments of the present invention and is not intended to be limiting. Numerous variations and modifications within the scope of the present invention are possible. The present invention is set forth in the following claims.

We claim:

1. A method for detection of multiple positioning signals, comprising:
   detecting a first positioning signal using non-coherent integration over blocks of a received signal of a predetermined size between 1 millisecond and 14 milliseconds;
   based on the first positional signal, determining the values of one or more signal detection parameters;
   using the values of the signal detection parameters, detecting a second positioning signal using coherent integration.

2. A method as in claim 1, wherein determining the values of one or more signal detection parameters includes aligning the first positioning signal relative to a navigation message embedded in the first positioning signal.

3. A method as in claim 1, wherein determining the values of one or more signal detection parameters includes determining an oscillator frequency.

4. A method as in claim 1, wherein determining the values of one or more signal detection parameters include determining an oscillator phase acceleration.

5. A method as in claim 1, wherein the non-coherent integration is performed by operating on correlation values computed based on the predetermined size blocks of a received signal.

6. A method as in claim 5, further comprising combining the correlation values into a single value.

7. A method as in claim 1, wherein determining the values of one or more signal detection parameters is carried out in the frequency domain.

8. A method as in claim 1, further comprising, prior to the coherent integration, removing the effect of a navigation message.

9. A method as in claim 8, wherein the removing comprising doubling an estimated phase angle.

10. A method as in claim 1 further comprising recovering a time stamp from the first positioning signal.

* * * * *